United States Patent
Fadei

(10) Patent No.: US 10,955,840 B2
(45) Date of Patent: Mar. 23, 2021

(54) APPARATUS AND METHOD FOR INSTALLING AND REPLACING LIGHT FIXTURE DEVICES

(71) Applicant: Current Lighting Solutions, LLC, East Cleveland, OH (US)

(72) Inventor: Adrian-Valentin Fadei, Lachine (CA)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 292 days.

(21) Appl. No.: 16/105,375

(22) Filed: Aug. 20, 2018

(65) Prior Publication Data

US 2020/0057440 A1 Feb. 20, 2020

(51) Int. Cl.
  *G05D 1/00* (2006.01)
  *B64C 39/02* (2006.01)
  *G06T 7/70* (2017.01)

(52) U.S. Cl.
  CPC ......... *G05D 1/0038* (2013.01); *B64C 39/024* (2013.01); *B64C 2201/027* (2013.01); *B64C 2201/12* (2013.01); *B64C 2201/146* (2013.01); *G06T 7/70* (2017.01); *G06T 2207/10016* (2013.01); *G06T 2207/30184* (2013.01)

(58) Field of Classification Search
  CPC .. G05D 1/0038; G05D 1/0866; B64C 39/024; B64C 2201/146; B64C 2201/12; B64C 2201/027; B64C 2201/06; G06T 2207/30184; G06T 7/70; G06T 2207/10016

See application file for complete search history.

(56) References Cited

U.S. PATENT DOCUMENTS

| 9,815,197 | B1  | 11/2017 | Pickover et al. | |
|---|---|---|---|---|
| 2013/0233964 | A1 | 9/2013 | Woodworth et al. | |
| 2016/0200437 | A1* | 7/2016 | Ryan | B64C 39/022 244/99.2 |
| 2016/0309341 | A1* | 10/2016 | Priest | B64D 47/08 |
| 2019/0338759 | A1* | 11/2019 | Badger | B29C 73/04 |

FOREIGN PATENT DOCUMENTS

KR  101808330 B1  1/2018

OTHER PUBLICATIONS

International Search Report and Written Opinion dated Dec. 4, 2019 which was issued in connection with PCT Application No. PCT/US2019/047212 which was filed on Aug. 20, 2019.

* cited by examiner

*Primary Examiner* — Adam R Mott
(74) *Attorney, Agent, or Firm* — Buckley, Maschoff & Talwalkar LLC

(57) ABSTRACT

Provided is a method and an apparatus for installing and replacing a lighting controller of an outdoor lighting fixture that includes a base portion supplying power, a telescopic stick portion attached to the base portion at a first end thereof,
an extension stick portion attached to a second end of the telescopic stick portion, and a drone-type device attached to the extension stick portion at an end opposite telescopic stick portion. The drone-type device receives power from the base portion through the telescopic stick portion and travels over and land at a top surface of the outdoor lighting fixture and perform installation or replacement of the lighting controller.

21 Claims, 6 Drawing Sheets

APPARATUS AND METHOD FOR INSTALLING AND REPLACING LIGHT FIXTURE DEVICES

TECHNICAL FIELD

The present invention relates generally to an outdoor lighting system. In particular, the present invention relates to a device for installing and replacement light fixture controllers and ambient light sensor (ALS) devices for outdoor lighting systems.

BACKGROUND

An outdoor lighting system, such as a roadway/outdoor lighting system, includes one or more lighting fixtures, each fixture typically providing illumination to surroundings within close proximity thereof. Such lighting fixtures can be found along the streets and street corners, and at roadway intersections.

The lighting fixtures also provide visibility during nighttime hours for security and safety purposes. These fixtures are generally positioned along streets and highways to enable pedestrian traffic and vehicle traffic to safely navigate the roadway after hours and in low lit areas.

The lighting fixtures are typically mounted on street poles as shown in FIG. 1. FIG. 1, for example, depicts a conventional outdoor lighting system 50, including a lighting pole 10, a mast arm 20 connected to the pole 10 at a proximal end. Also, included is a lighting fixture 30 physically coupled to a distal end of the mast arm 20. The roadway outdoor lighting system 50 is typically disposed in the ground at a bottom of the lighting pole 10.

The lighting pole 10 and the mast arm 20 includes electrical wiring for connecting and energizing the lighting fixture via a utility grid. The lighting fixture 30 typically includes a lighting device 32 and a connector 40 at a top surface thereof for connecting to a node (i.e., a lighting controller) 45 for controlling the lighting fixture 30.

Typically, an operator uses a bucket truck to replace or install the lighting fixture 30 or the lighting controller 45, which can cause additional costs and maintenance issues due to use of the bucket truck.

SUMMARY OF THE EMBODIMENTS

Given the aforementioned deficiencies, a need exists for more adaptable device for installing and replacing lighting controllers or ALS devices (e.g., sensors) of outdoor lighting systems.

Under certain circumstances, embodiments of the present invention provide an apparatus for installing and replacing a lighting controller of an outdoor lighting fixture. The apparatus includes a base portion supplying power, a telescopic stick portion attached to the base portion at a first end thereof, an extension stick portion attached to a second end of the telescopic stick portion, and a drone-type device attached to the extension stick portion at an end opposite telescopic stick portion. The drone-type device receives power from the base portion through the telescopic stick portion and travels over and land at a top surface of the outdoor lighting fixture and perform installation or replacement of the lighting controller.

In another exemplary embodiment, a remote controller is provided to perform the operations of the drone-type device.

In yet another exemplary embodiment, a method for performing operating the above-mentioned apparatus is also provided.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

Figure 1:
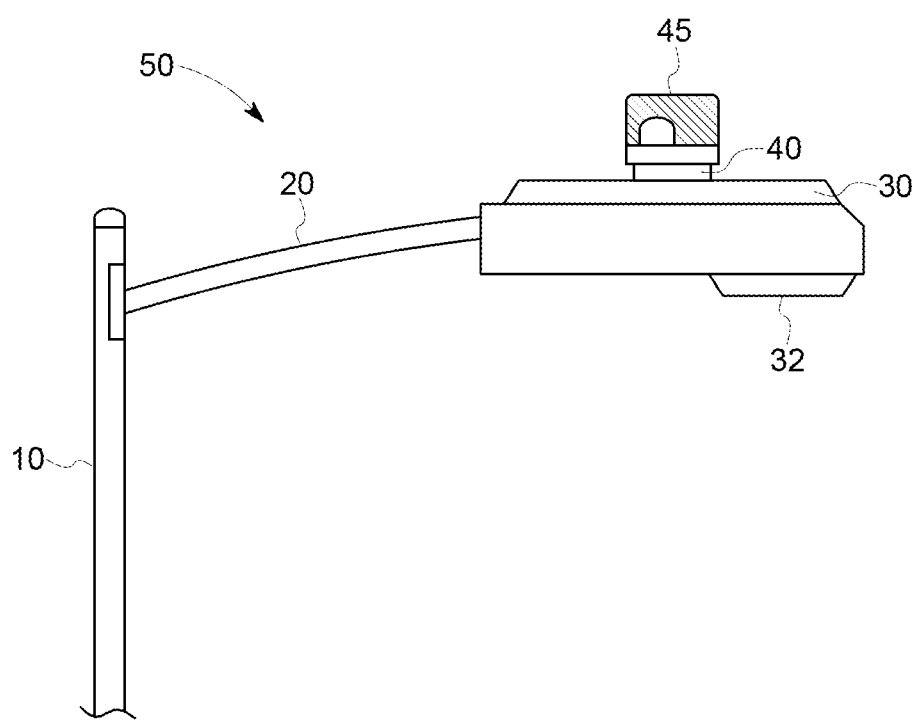
FIG. 1 is a schematic illustrating a conventional outdoor lighting system.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide an apparatus and method for installing and replacing lighting controllers and ALS devices (e.g., sensors) of an outdoor lighting system. The present invention is not limited to being used within an outdoor lighting system and can be used within other suitable lighting systems such as indoor lighting systems. The apparatus can also be used for example, within other environments, for example, for performing roof inspections, filming sporting events, trimming tall trees, and accessing any kind of sensors/cameras fixed on an outdoor pole for maintenance and replacement (e.g., cleaning video camera lenses).

Figure 2:
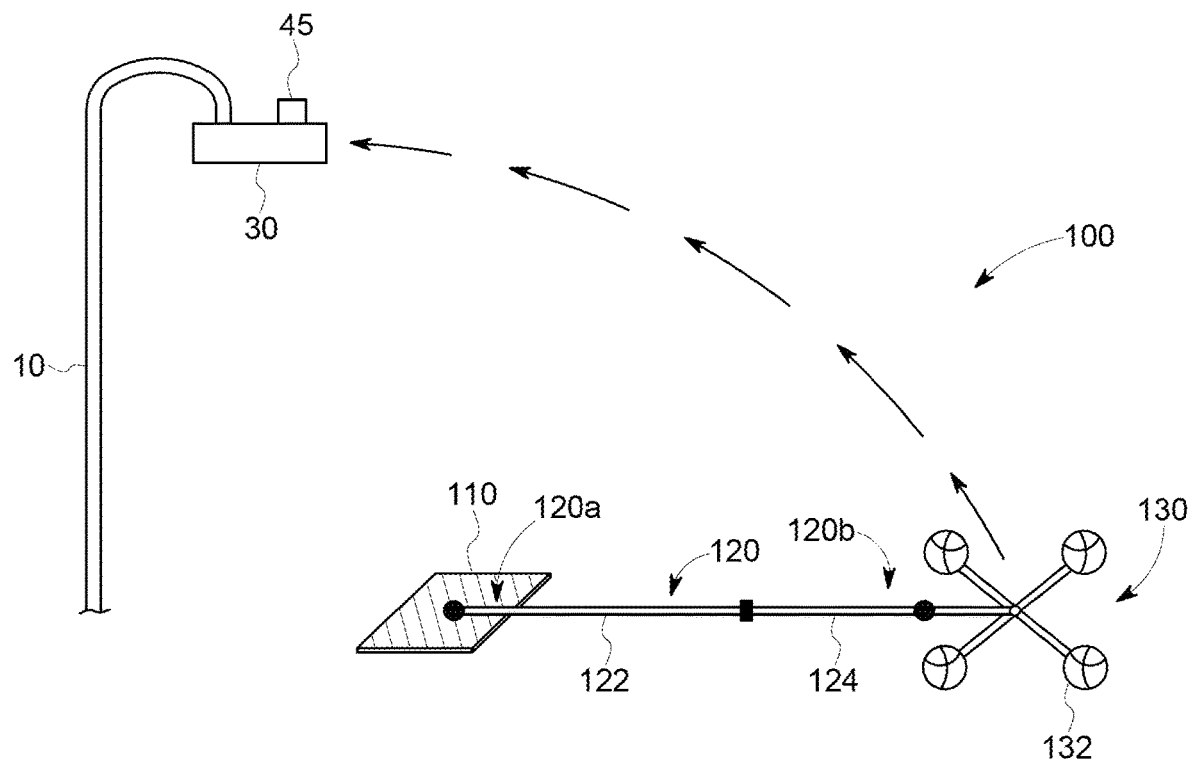
FIG. 2 is a schematic illustrating an apparatus for installing and replacing a lighting controller of the outdoor lighting system that can be implemented within one or more embodiments.
Figure 3:
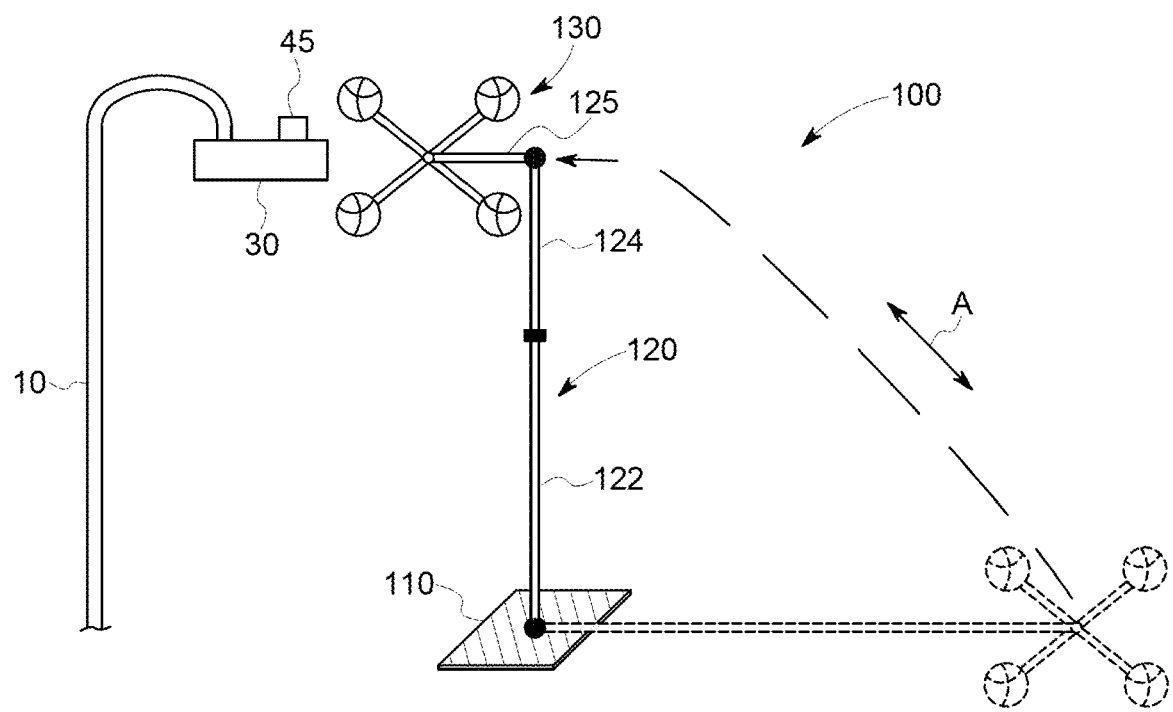
FIG. 3 is a schematic illustrating the apparatus of FIG. 2, performing a traveling and landing operation that can be implemented within one or more embodiments of the present invention.

FIGS. 2 and 3 are schematics illustrating an exemplary apparatus 100 that can be implemented within one or more of the embodiments. The apparatus 100 is used to perform installation and replacement of the lighting controller 45. The lighting controller 45 is associated with the lighting fixture 30 attached to the lighting pole 10. The apparatus 100 includes a base portion 110, a telescopic stick portion 120 and a drone-type device 130. Details of the base portion 110, the telescopic stick portion 120, and the drone-type device 130 will be discussed with reference to FIGS. 4A-4C and 5A-5B.

Figure 4A:
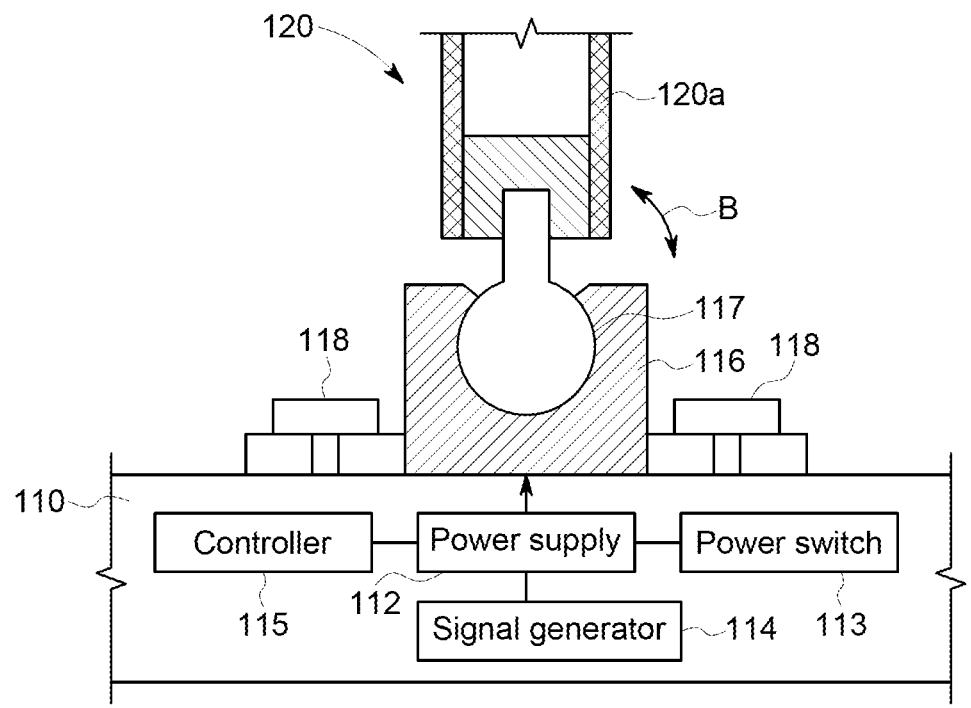
FIGS. 4A through 4C are schematics illustrating a front view, top view and a side view of a base portion of the apparatus of FIG. 2 that can be implemented within one or more embodiments of the present invention.

As shown in FIG. 4A, the base portion 110 includes a power supply 112 for supplying power to the drone-type device 130 (as depicted in FIGS. 2 and 3). The power supply 112 can be a rechargeable or replaceable battery for supplying power up to approximately 4 to 8 hours of continuous operation of the apparatus 100. A power plug can also be provided according to other embodiments, which will allow recharging of the base portion 110 from a 12V/24V power supply of a vehicle or a power socket. A battery charger, including a processor, can also be included to allow onboard charging of the power supply 112.

The base portion 110 further includes a power switch 113 to apply power to the drone-type device 130. The base portion 110 also includes a signal generator 114 to emit a signal (e.g., an audible and/or visual signal) when the drone-type device 130 is powered to warn the operator, and persons within proximity, about the drone-type device 130 operation. A controller 115 is also provided to control the base portion 110, the power switch 113, the signal generator 114, and the operation of the telescopic stick portion 130.

Figure 4B:
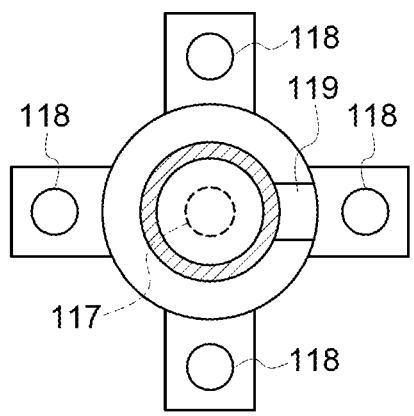
Figure 4C:
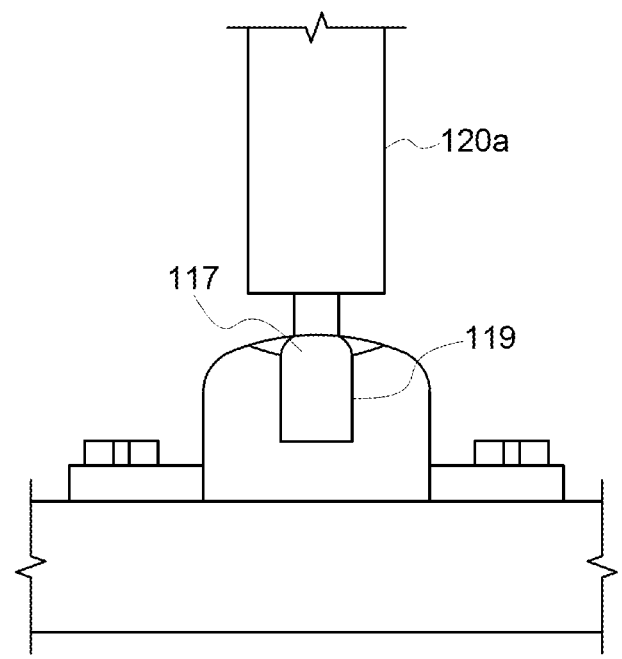

The base portion 110 further includes a housing portion 116 for housing a ball joint 117 fixedly connected with the telescopic stick portion 120 therein. This assembly facilitates lateral movement of the telescopic stick portion 120 as indicated by arrow 'B'. The housing portion 116 is connected at a top surface of the base portion 110 via fixing screws 118 or other fixing components and includes an opening 119 on one side thereof in the landing side direction of the drone-type device 130 (as depicted in FIGS. 4B and 4C).

The ball joint 117 rotates to allow movement of approximately 15-30 degrees in any direction of the telescopic stick portion 120. Movement of approximately 90 degrees can occur in one direction via the opening 119 to allow the drone-type device 130 to land (as depicted in FIG. 2).

The base portion 110 can be of a minimal shape and size. For example, the base portion 110 can be formed in a circular shape with a radius of approximately 3 feet. Alternatively, the base portion 110 can be square shaped with sides of approximately 3 feet and a weight of approximately 20 pounds.

Additionally, the base portion 110 can also be formed of several nesting parts (example: four quarters of a circle), each part having (i) a fraction of the total weights and (ii) some of them (or all of them) can comprise parts of the battery. The battery parts are interconnected when nesting all of the nesting parts. The height of the base portion 110 is desirably between approximately 1 to 2 inches to allow for hosting the power supply 112 and the controller 118 and for the weight required for stability of the apparatus 100. The present invention is not limited hereto, and the base portion 110 can be formed of any shape or size suitable for the purposes set forth herein.

According to another embodiment, the base portion 110 can include more than one (e.g., four (4)) horizontal extension sticks to enhance stability of the apparatus 100. The extension sticks can be telescopically extending horizontally from the side walls of the base portion 110 and including a locking mechanism for locking in an extended position. In a retracted position, the extension sticks are stored within the base portion 120. In the extended position, the extension sticks enhance the stability of the apparatus 120 by doubling the supporting radius around the telescopic stick portion 120.

The base portion 120 can be installed approximately 2 to 4 feet away from the vertical line of the lighting fixture 30. A work zone, including the base portion and landing zone for the drone-type device 130, can be marked with road works markers to block pedestrians entering it.

As shown in FIG. 2, the telescopic stick portion 120 is attached to the base portion 110 at a first end 120a thereof. The telescopic stick portion 120 includes multiple portions with decreasing diameters. For example, included is a lower stick portion 122 and an upper stick portion 124. One portion 122, 124 can fit into the other portion 122, 124 for performing movement in a horizontal direction. This movement facilitates traveling and landing over a top surface of the lighting controller 45. The number of portions 122, 124 can vary up to approximately 5 to 8 cylinders, for example, with each portion of an approximate length of at least 8 feet. This forms a retractable, telescopic stick portion 120 of approximately 35 feet in total height.

By way of example, the portions 122, 124 can be formed of a fiber glass or other light weight material. The power supply travels from one end 120a of the telescopic stick portion 120 to the other end 120b through one of the following: (i) an internal spiral shape wire stored within the tubes, (ii) a wire attached outside the tube, or (iii) conductor layer deposited on the cylinders walls whereby an electrical connection between the portions 122, 124 are ensured through brush contacts, for example.

Diameter of the portions 122, 124 depends on the maximal height reachable and on the drone-type device size. Example: the lower end side can have 2 inches and the upper size can have 0.5 inches.

The apparatus 100 further includes an extension stick 125 to be connected with the drone-type device 130 (as depicted in FIG. 3). Details of the connection between the telescopic stick portion 120 and the extension stick portion 125 and between the extension stick portion and the drone-type device 130 will now be discussed with reference to FIGS. 5A and 5B.

Figure 5A:
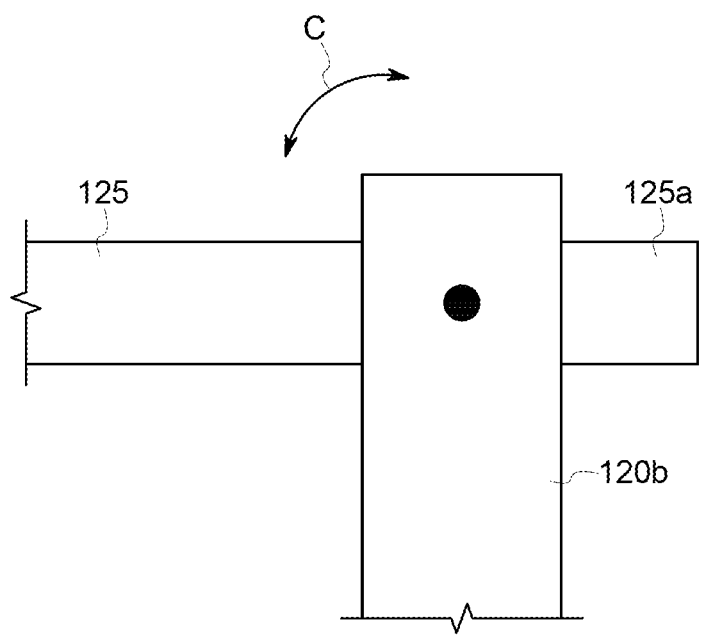
FIGS. 5A and 5B are schematics illustrating the connection between the telescopic stick portion and the extension stick portion, and the extension stick portion and the drone-type device of the apparatus that can be implemented within embodiments of the present invention.

As shown in FIG. 5A, the upper end 120b of the telescopic stick portion 120 is connected to the extension stick portion 125 at a first end 125a. This connection enables the extension stick portion 125 to rotate as indicated by the arrow 'C'. By way of example, the connection may be (i) fixed at approximately 90 degree between them or may be (ii) mobile through a hinge-type or ball joint-type connection.

Figure 5B:
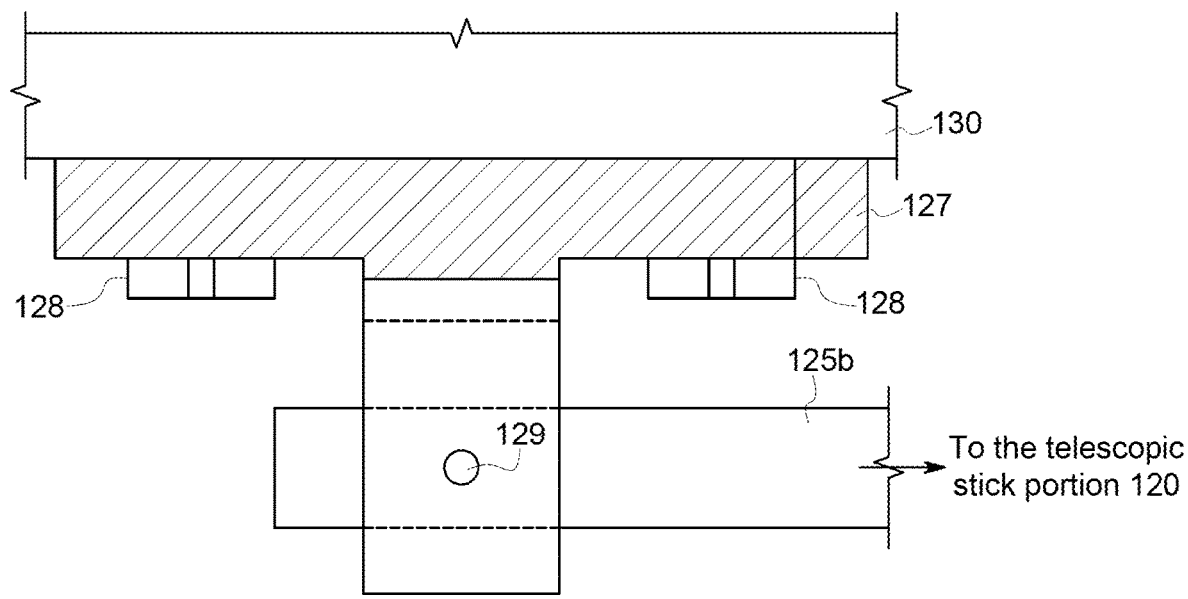

As depicted in FIG. 5B, the drone-type device 130 is attached to the extension stick portion 125 at a second end 125b thereof opposite from the first end 125a (depicted in FIG. 5A). The extension stick portion 125 allows the drone-type device 130 to go over lighting fixture 30 (as depicted in FIG. 1) while the base portion 110 with the telescopic stick portion 120 is installed aside of the vertical of the lighting fixture 30.

The extension stick portion 125 is connected to the drone-type device 130 via a connector body 127 attached to the bottom surface of the drone-type device 130 and fixed thereto via screws 128, for example. The connection between the extension stick portion 125 and the drone-type device 130 via the connector body 127 is a hinge-type or ball joint-type connection 129, allowing 180-degree rotation of the extension stick portion 125.

Referring back to FIG. 1, the extension stick portion 125 is deployed horizontally between the telescopic stick portion 120 and the drone-type device 130. Referring back to FIG. 2, the extension stick portion 125 is driven by the drone-type device 130, when landing over the lighting fixture 30 as indicated by arrow 'A'.

According to the embodiments, the extension stick portion 125 is formed of a fiber glass tube or other light weight material, and includes wires required to pass electrical power to the drone-type device 130. The extension stick portion 125 is telescopic and its length may be preset by the operator according to the lighting fixture characteristics. This can occur before drone-type device 130 takeoff. Accordingly, during the drone-type device 130 flight, the extension stick portion 125 has a fixed length.

As an example, the extension stick portion 125 can have a radius of approximately 0.5 inch and a length of between approximately 2 to 4 feet. The extension stick portion 125 is not limited to a particular size or shape and can vary as desired.

The drone-type device 130 is a captive drone-type device with the capabilities to perform replacement and installation of lighting controllers 45 and ALS devices (e.g., sensors) attached to a lighting pole 10 (as depicted in FIG. 3). The drone-type device 130 includes multiple propellers 132, for example, four (4) as shown, which are protected to not interfere with the lighting fixture 30 or the lighting environment.

Figure 6:
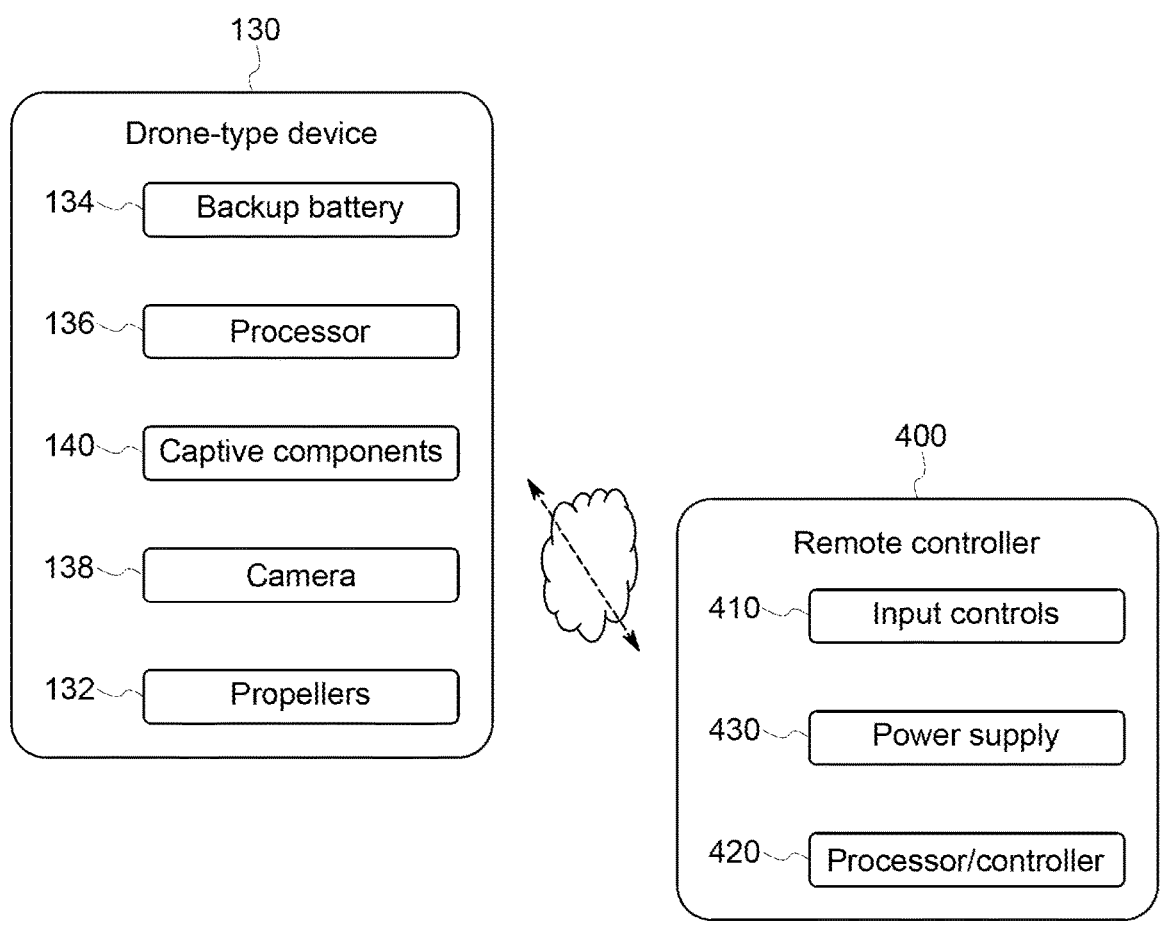
FIG. 6 is a block diagram of a remote controller in communication with the drone-type device for operation, as shown in FIGS. 2 and 3, that can be implemented within one or more embodiments of the present invention.

As shown in FIG. 6, the drone-type device 130 further includes a backup battery 134, a processor 136, a camera 138 and a captive component 140 to perform installation and replacement operations. According to an embodiment, the drone-type device 130 is not a real drone which can fly independently and is therefore not subject to air/space regulations. It is powered from the ground through the base portion 110.

The drone-type device 130 is configured to receive power from the base portion 110 through the telescopic stick portion 120 and the extension stick portion 125 (as depicted in FIGS. 4A through 4C, 5A and 5B). A remote controller 400 as shown in FIG. 4, is used to control the operations of the drone-type device 130.

The remote controller 400 includes directional input controls 410 (e.g., up/down, left, right, forward, backward), a processor/controller 420 and an internal power supply 430 and communicates with the drone type device 130 via wireless communication.

During operation, the drone-type device 130 can lift, as indicated by arrow A shown in FIG. 3, the upper stick portion 124 of the telescopic stick portion 120 to over the top surface of the lighting fixture 30. Accordingly, the drone-type device 130 Ken land thereon to perform an install or replacement of the lighting controller 45. The drone-type device's 130 vertical range of movement correspondence to the maximum length of the telescopic stick portion 120.

The drone-type device's 130 horizontal range of movement in the left/right and forward/backward direction is limited to approximately 12 feet (ft) from a left and right side of the lighting fixture 30 or ALS device to be installed or replaced. The camera 138 can capture video data/stream to be used for video analytics on the drone-type device 130 and at the remote controller 400. The video stream can be used by the remote controller 400 to display a video image for the operator to help control the drone-type device 130 and land it over the lighting fixture 30.

The path of the drone-type device 130, between the landing zone to the top of the lighting fixture 30, covers a distance based on the height of the lighting fixture 30 and the number of portions 122, 124 of the telescopic stick portion 120. By using approximately eight (8) feet portions 122 and if using approximately five (5) portions 122, 124 total, a lighting fixture 30 installed at approximately 35 feet can be reached.

Thus, in operation, the foot print on the ground will be approximately 16 feet around the base portion 110 at takeoff. For landing, the operator can drive the drone-type device 130, to ensure retract of the telescopic stick portion 120 to minimize the operation footprint. Highway fixtures may be up to approximately 98 feet high such that a more robust and larger version of the apparatus 100 may be constructed for this use in accordance with other embodiments.

Figure 7:
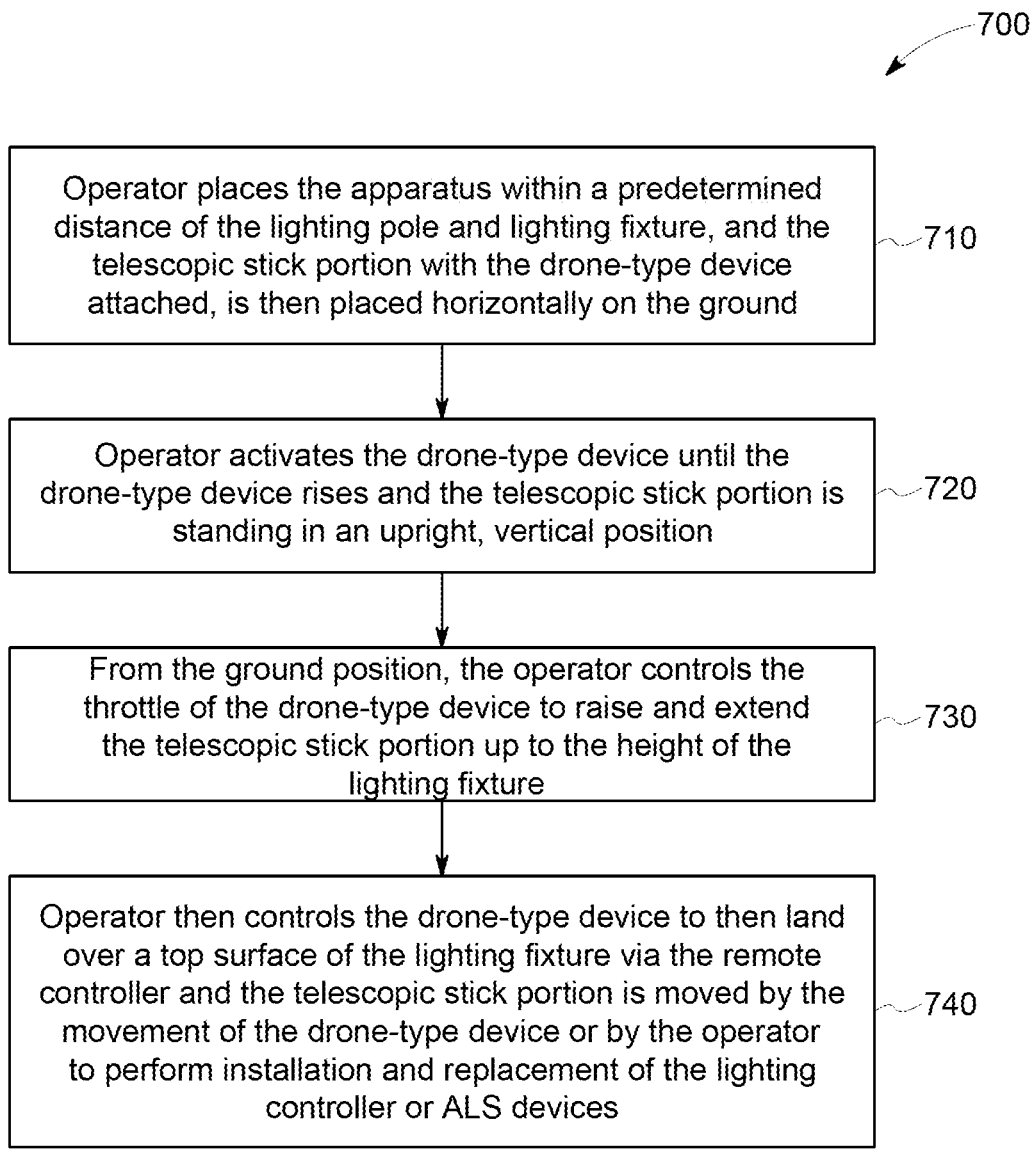
FIG. 7 is a flow chart illustrating an exemplary method performed by the apparatus of FIGS. 2 and 3, that can be implemented within one or more embodiments of the present invention.

An exemplary method 700 shown in FIG. 7, for performing the operations of the apparatus 100, will now be described with reference to FIGS. 2 through 5B. As shown in operation 710, an operator places the apparatus 100 within a predetermined distance of the lighting pole 10 and lighting fixture 30. The telescopic stick portion 120 with the drone-type device 130 attached, is then placed horizontally on the ground (as shown in FIG. 2).

At operation 720, the operator can activate the drone-type device 130 until the drone-type device 130 rises in a direction 'A' and the telescopic stick portion 120 is standing in an upright, vertical position. From operation 720, the process moves to operation 530. Here, from the ground position, an operator can control the throttle of the drone-type device 130 to raise and extend the telescopic stick portion 120 up to the height of the lighting fixture 30.

When the drone-type device 130 is above the level of the lighting fixture 30, the operator keeps the drone-type device 130 throttle constant. At the same time, with the right hand, the operator grabs the telescopic stick portion at his/her arm height and controls the position of the drone-type device 130 through the movement of the telescopic stick portion 120.

The telescopic stick portion 120, due to the ball joint 117 at the lower end toward the base portion 110, allows the operator to pull/push horizontally the telescopic stick portion 120 at his/her arm level. This allows enabling the drone-type device 130 to come close to the lighting fixture 30. It also permits rotating the extension stick portion 125 to control the drone-type device 130 over the perpendicular axis of the drone-type device 130. When the drone-type device 130 is above the lighting fixture 30, the operator slightly decreases the throttle of the drone-type device 130 until it lands over the lighting fixture 30.

At operation 740, the operator controls the drone-type device 130 to land over a top surface of the lighting fixture 30 via the remote controller 400. The telescopic stick portion 120 is moved by the movement of the drone-type device 130 or by the operator to perform installation and replacement of the lighting controller 45 or ALS devices.

Alternatively, at operations 730 and 740, the onboard camera 138 can be used to automate the landing of the drone-type device 130 over the lighting fixture 30. A software module can be employed within the camera 138 to identify the position of the lighting fixture 30 and to control the landing over the lighting fixture 30. Video analytics may be used to recognize the light controller 45 position and, associated with a drone-type device, control software to land the drone-type device of the lighting controller 45 or ALS devices without operator intervention.

In case of a power loss at base portion 110, the method may further include the ability to safely land itself using the internal backup battery 136.

As described above, an apparatus constructed according to embodiments provides the advantages of being able to perform replacement and installation of lighting components. By way of example, the components can include lighting controllers, and ALS devices (e.g., sensors) etc. Replacement and installation can occur without unnecessary challenges and costs due to use of a bucket truck.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for installing and replacing a lighting controller of an outdoor lighting fixture comprising:
   a base portion supplying power;
   a telescopic stick portion attached to the base portion at a first end thereof;
   a rigid extension stick portion attached to a second end of the telescopic stick portion; and
   a drone-type device directly attached to the rigid extension stick portion at an end opposite telescopic stick portion, and configured to: (i) receive power from the base portion through the telescopic stick portion and (ii) travel over and land at a top surface of the outdoor lighting fixture and perform installation or replacement of the lighting controller.

2. The apparatus of claim 1, wherein the base portion comprises:
   a power supply for supplying power to the drone-type device;
   a ball joint at a top surface thereof to be connected with the telescopic stick portion to perform lateral movement of the telescopic stick portion;
   a power switch configured to apply power to the drone-type device; and
   a signal generator configured to emit a signal when the drone-type device is powered to indicate operability thereof.

3. The apparatus of claim 2, wherein the power supply is a rechargeable or replaceable battery.

4. The apparatus of claim 1, wherein the telescopic stick portion comprises:
   a plurality of stick portions comprising:
   a lower stick portion adjacent to the first end, and
   an upper stick portion to be attached to the rigid extension stick portion, wherein the rigid extension stick portion is attached to the drone-type device, for performing movement in a horizontal and vertical directions to facilitate traveling and landing over the top surface of the lighting controller.

5. The apparatus of claim 4, wherein the lower stick portion and the upper stick portion are configured to be telescopic wherein one stick portion fits into the other stick portion, and each comprise an opening therein for receiving wires therethrough to receive power via the base portion, to be transmitted to the drone-type device for operation thereof.

6. The apparatus of claim 4, wherein the lower stick portion and the upper stick portion are configured to be telescopic wherein one stick portion fits into the other stick portion and each comprise a wire attached to an outside thereof or a conductor layer deposited on walls thereof whereby an electrical connection can be made to between the lower and upper stick portions.

7. The apparatus of claim 4, wherein an upper end of the telescopic stick portion is connected to the rigid extension stick portion to enable the rigid extension stick portion to rotate, wherein the connection is fixed at approximately 90 degrees.

8. The apparatus of claim 4, wherein a connection between the rigid extension stick portion and the drone-type device is a hinge-type or ball-joint type connection which enables 180 degree rotation of the rigid extension stick portion.

9. The apparatus of claim 8, wherein the rigid extension stick portion is deployed horizontally between the telescopic stick portion and the drone-type device when in an initial state.

10. The apparatus of claim 9, wherein the rigid extension stick portion is driven by the drone-type device when landing over the outdoor lighting fixture.

11. The apparatus of claim 9, wherein the rigid extension stick portion is telescopic and a length thereof is preset to be fixed by an operator according to characteristics of the outdoor lighting fixture, prior to take-off of the drone-type device.

12. The apparatus of claim 4, wherein the drone-type device comprises:
    at least a pair of propellers;
    a backup battery to supply power in event of power failure at base portion;
    a processor to receive instructions for operation thereof;
    a camera to capture video; and
    a captive tool to perform installation and replacement operations.

13. The apparatus of claim 12, further comprising:
    a remote controller configured to control movement of the drone-type device, the remote controller comprising directional controls and an internal power supply, and communicates with the drone-type device via wireless communication.

14. The apparatus of claim 13, wherein the camera captures video to be used for video analytics on the drone-type device and at the remote controller, wherein remote controller is further configured to display video image for an operator to control the drone-type device to land over the outdoor lighting fixture.

15. The apparatus of claim 13, wherein upon initiation of operation, the remote controller controls the drone-type device to lift the rigid extension stick portion over the top surface of the outdoor lighting fixture and land thereon to perform an install or replacement of the outdoor lighting controller.

16. The apparatus of claim 15, wherein a vertical range of movement of the drone-type device corresponds to a maximum length of the telescopic stick portion.

17. The apparatus of claim 15, wherein a horizontal range of movement of the drone-type device ranges from approximately 12 feet (ft) from each side of the outdoor lighting fixture.

18. A method for performing installation and replacement of the lighting controller of an outdoor lighting fixture comprising:
   providing, via a remote controller, an apparatus comprising a base portion having a telescopic stick portion including a lower stick portion and an upper stick portion directly connected to a drone-type device within a predetermined distance of the outdoor lighting fixture,
   supplying power, via the base portion, to the apparatus,
   extending, via a rigid extension stick portion connected with the telescopic stick portion, the drone-type device over and landing at a top surface of the outdoor lighting fixture to perform installation or replacement of the lighting controller.

19. The method of claim 18, wherein providing the apparatus further comprises positioning, the telescopic stick portion with the drone-type device attached, horizontally on a ground surface.

20. The method of claim 18, wherein extending the drone-type device further comprises:
   from a ground position, controlling a throttle of the drone-type device to raise and extend the telescopic stick portion up to a height of the outdoor lighting fixture;
   maintaining the throttle to be constant when the drone-type device Is above the height of the outdoor lighting fixture;
   controlling a position of the drone-type device through a movement of the telescopic stick portion and the rigid extension stick portion; and
   controlling, via the remote controller, the drone-type device to land over the top surface of the outdoor lighting fixture to perform installation and replacement of the lighting controller.

21. The method of claim 18, further comprising:
   landing, via the remote controller, the drone-type device using an internal backup battery in event of power failure at base portion.

* * * * *